US008326498B2

(12) United States Patent
Witek

(10) Patent No.: US 8,326,498 B2
(45) Date of Patent: Dec. 4, 2012

(54) VEHICLE ANTI-PINCH CONTROL HAVING VARIABLE THRESHOLD AND METHOD

(75) Inventor: Joseph S. Witek, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 637 days.

(21) Appl. No.: 12/565,867

(22) Filed: Sep. 24, 2009

(65) Prior Publication Data

US 2011/0071735 A1 Mar. 24, 2011

(51) Int. Cl.
*B60R 22/00* (2006.01)

(52) U.S. Cl. ............. 701/49; 701/45; 180/232; 280/734

(58) Field of Classification Search .................... 701/45, 701/46, 49; 180/232; 280/734, 735; 318/285, 318/445
See application file for complete search history.

(56) References Cited

U.S. PATENT DOCUMENTS

| | | | | |
|---|---|---|---|---|
| 4,516,034 | A | 5/1985 | Bier | |
| 4,649,286 | A | 3/1987 | Takeda et al. | |
| 4,733,145 | A | 3/1988 | Ohashi et al. | |
| 4,796,013 | A | 1/1989 | Yasuda et al. | |
| 4,808,894 | A | 2/1989 | Mizuta | |
| 5,957,491 | A | 9/1999 | Cech et al. | |
| 6,219,599 | B1 | 4/2001 | Lamm et al. | |
| 6,275,146 | B1 | 8/2001 | Kithil et al. | |
| 6,388,410 | B1 | 5/2002 | Hohn | |
| 6,793,242 | B2 | 9/2004 | Breed et al. | |
| 6,868,734 | B2 | 3/2005 | Jakoby et al. | |
| 6,906,482 | B2 | 6/2005 | Shimizu et al. | |
| 7,009,509 | B2 | 3/2006 | Sakai | |
| 7,224,136 | B2 | 5/2007 | Saitou et al. | |
| 7,342,373 | B2 | 3/2008 | Newman et al. | |
| 7,434,650 | B2 | 10/2008 | Hofbeck et al. | |
| 7,482,773 | B2 | 1/2009 | Heyn | |
| 7,489,095 | B2 | 2/2009 | Pebre | |
| 7,518,325 | B2 | 4/2009 | Odland et al. | |
| 7,541,759 | B2 * | 6/2009 | Hirai | 318/286 |
| 2004/0065498 | A1 * | 4/2004 | Onozawa et al. | 180/286 |
| 2006/0238002 | A1 | 10/2006 | Heyn et al. | |
| 2007/0095595 | A1 | 5/2007 | Cheramy | |
| 2008/0136358 | A1 | 6/2008 | Newman et al. | |

* cited by examiner

*Primary Examiner* — Gertrude Arthur Jeanglaude
(74) *Attorney, Agent, or Firm* — Raymond L. Coppiellie; Price Heneveld LLP

(57) ABSTRACT

A vehicle is provided which includes a closure member such as a powered window or a moon roof or sunroof that may be controlled in an auto close mode. The closure member may be controlled with anti-pinch control to provide a plurality of thresholds that are selected based on the presence of an occupant in close proximity to the vehicle, such as in the vehicle, so that an unsupervised control of the closure member provides a lower anti-pinch threshold than a supervised control of the closure member.

28 Claims, 3 Drawing Sheets

VEHICLE ANTI-PINCH CONTROL HAVING VARIABLE THRESHOLD AND METHOD

FIELD OF THE INVENTION

The present invention generally relates to vehicle closure members, and more particularly relates to anti-pinch sensing and control of the closure member.

BACKGROUND OF THE INVENTION

Automotive vehicles are commonly equipped with powered windows that move up and down within a vehicle door opening and some vehicles have a sunroof or moon roof that moves a closure member fore and aft between closed and open positions in roof of the body. The powered window and moon roof assemblies typically include a glass member that is powered by an electric motor to move between the open and closed positions to cover or open an opening in the body of the vehicle. When the closure member moves from the open position to the closed position, it is desirable to prevent impingement or closure of the closure member upon an object, such as an occupant's appendage.

In order to minimize the risk to closing or pinching the closure member on an object, some vehicles are equipped with anti-pinch control to minimize or prevent damage to an object that is impinged by the closure member during closure. In doing so, the electric current of the motor may be sensed to detect an increased load indicative of a potential object trapped within the opening by the closure member. When the sensed current reaches a threshold value, the motor may be controlled to stop and reverse direction.

In some vehicle use scenarios, it may be desirable to provide enhanced flexible control of the anti-pinch control so as to allow for enhanced use of the motor vehicle.

SUMMARY OF THE INVENTION

According to one aspect of the present invention, a vehicle is provided that includes a body having an opening, a closure member, and an actuator for actuating the closure member between open and closed positions of the opening. The vehicle also includes an occupant detector for detecting presence of an occupant. The vehicle further comprises a controller for controlling the actuator to actuate the closure member based on a first anti-pinch threshold when an occupant is detected. The controller also controls the actuator to actuate the closure member based on a second threshold when there is no occupant detected.

According to another aspect of the present invention, a system for controlling a closure member between open and closed positions of an opening in a body of a vehicle is provided. The system includes an occupant detector for detecting presence of an occupant in close proximity to the vehicle. The system also includes a controller controlling an actuator to close the closure member based on a first anti-pinch threshold when an occupant is detected and based on a second anti-pinch threshold when no occupant is detected.

According to a further aspect of the present invention, a method of controlling a vehicle closure relative to an opening in the body of the vehicle is provided. The method includes the steps of detecting whether a vehicle occupant is in close proximity to the vehicle, selecting the anti-pinch threshold based on the occupant detection, actuating a motor to close the closure member relative to the opening in the vehicle, sensing current of the motor, comparing the motor current to the selected anti-pinch threshold to determine whether the closure member may be pinched by an object, and reversing or stopping the motor when the current exceeds the selected anti-pinch threshold.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
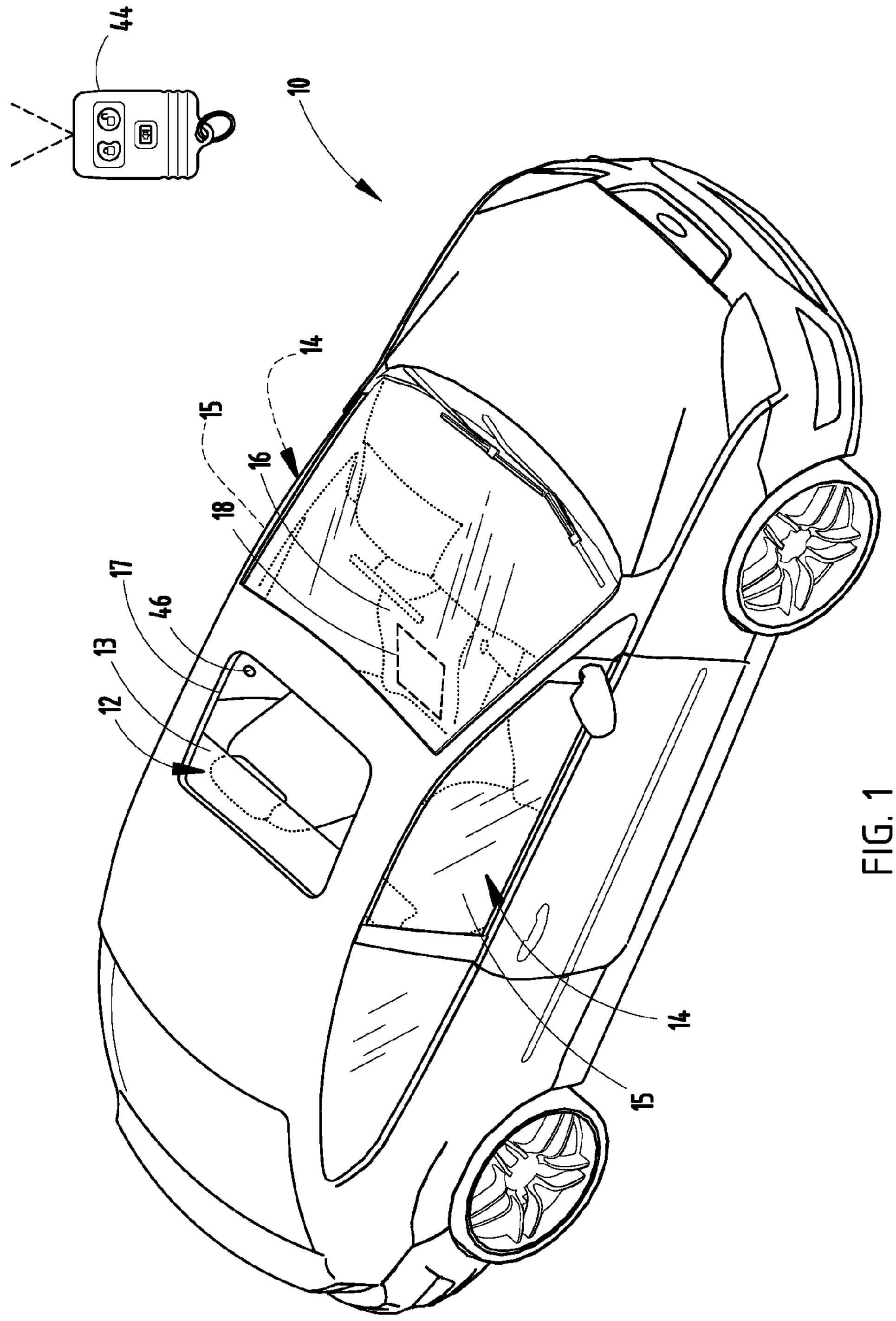
FIG. 1 is a perspective view of an automotive vehicle employing an anti-pinch control system according to one embodiment.

Referring now to FIG. 1, an automotive passenger vehicle 10 is generally illustrated equipped with various movable closure members and an anti-pinch closure system for controlling the closure members. The vehicle 10 is generally shown as a passenger car having a body that includes powered window assemblies 14 each having a closure member in the form of a window 15 that moves between open and closed positions within an opening in the vehicle body, shown as the side door of the vehicle 10. Typically, the window members 15 of window assemblies 14 are actuated by a motor to move upward towards the closed position and downward towards the open position. Additionally, the vehicle 10 has a powered moon roof or sunroof assembly 12 located in the roof of the vehicle body which includes a movable member, such as a transparent glass window 13, that is actuated by a motor to move fore and aft between a closed position and an open position with respect to an opening 17 in the vehicle roof, as should be evident to those skilled in the art.

The door windows 14 may be electrically powered windows that include an actuator, such as a motor, to actuate the window closure member 15 down and up between the open and closed positions, respectively. This is generally achieved in response to a passenger of the vehicle actuating a switch in either of the up or down positions, and a motor responsive to the switch that actuates the window closure member 15 upward or downward. Similarly, the moon roof or sunroof assembly 12 may be actuated responsive to a user switch and may include an actuator, such as a motor, to move the movable closure member 13 between the open position and the closed position. Additionally, the vehicle 10 may be equipped with an automatic close feature in which the window assemblies 14 and moon roof or sunroof assembly 12 are automatically closed when the vehicle 10 is turned off, such as when the vehicle ignition is turned off. This prevents the closure members 13 and 15 from being left in the open position when the vehicle 10 is not operating.

The vehicle 10 is also shown including a passenger occupant detection system (PODS) 18 which includes a fluid bladder located in the front driver seat that detects the weight or force on the seat to determine the presence of an occupant seated in the corresponding seat 16. In the embodiment shown, a PODS 18 is provided in the driver seat to detect the presence of a driver in the vehicle. However, it should be appreciated that a PODS 18 may also be provided in the front passenger seat to detect the presence of a passenger in the vehicle. Additionally, an infrared sensor 46 is provided and is shown located in the vehicle door to the side of the driver seat 16, in one embodiment, for sensing the presence of an occupant seated in driver seat 16, an IR sensor could also be located adjacent the opposite passenger seat.

A key fob 44 is further illustrated which generally includes various functions for controlling the vehicle 10 such as locking and unlocking the vehicle doors, actuating an alarm, and other features. The key fob 44 generally communicates with the vehicle 10, particularly a vehicle controller, via radio frequency (RF) signals. It should be appreciated that the key fob 44 provides RF signals at a frequency and amplitude which may be processed to determine the relative proximity of the key fob 44, and hence the vehicle operator (driver), relative to the vehicle 10 so that the distance between the key fob 44 and the vehicle 10 may be determined. By using the key fob 44, the closure system 20 may determine whether the key fob 44, and hence presumably the operator of the vehicle 10, is within a certain distance of the vehicle 10 such that the occupant is determined to be in close proximity to the vehicle 10.

Figure 2:
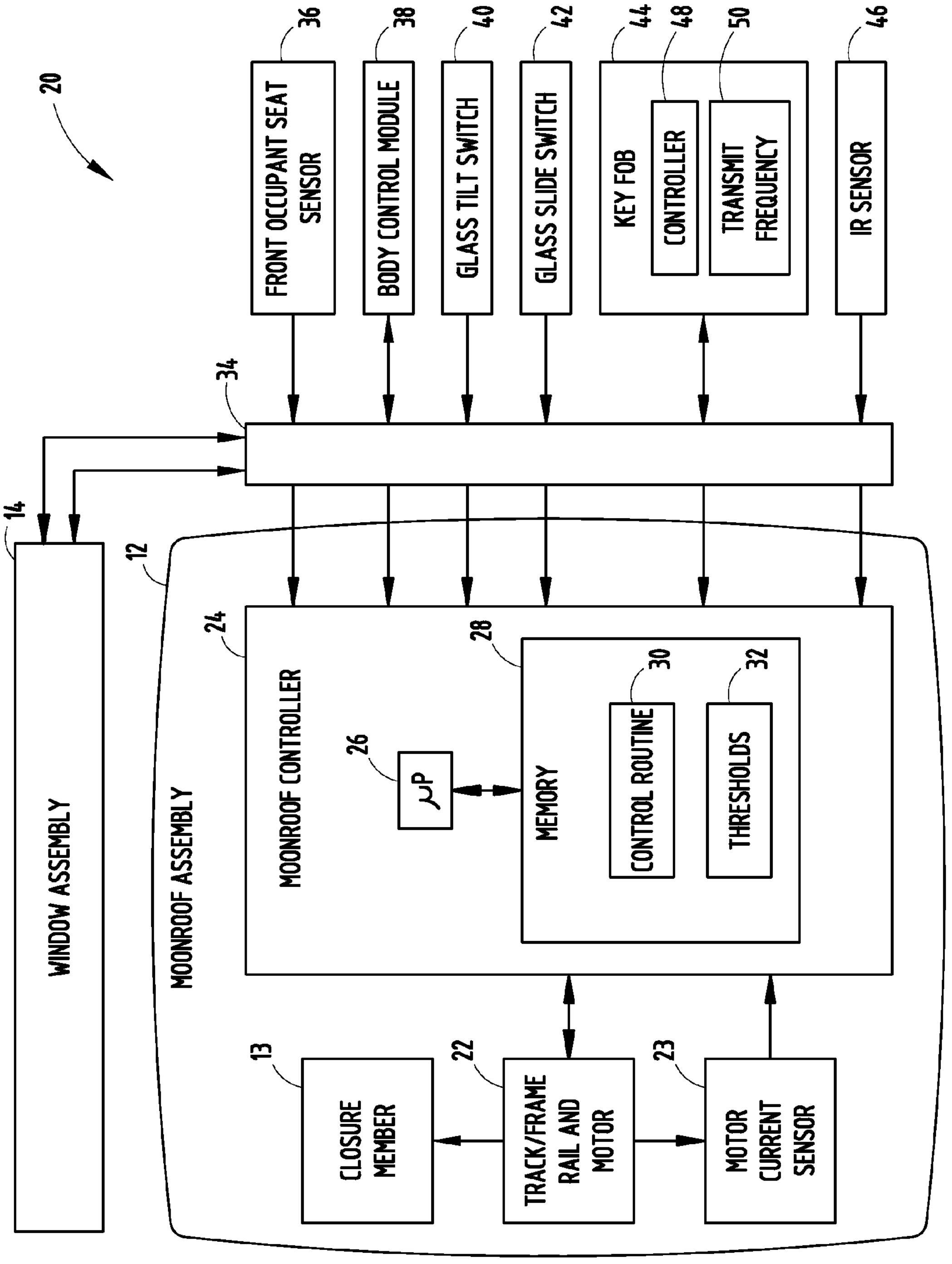
FIG. 2 is a block diagram which illustrates the anti-pinch control system according to one embodiment.

Referring to FIG. 2, the closure system 20 is further illustrated showing the moon roof assembly 12 and a window assembly 14. The moon roof assembly 12 has a moon roof controller 24 and a track/frame rail and motor 22. The track/frame rail and motor 22 support and control activation and movement of the moon roof assembly 12 including its closure member 13, which may include a window, that slidingly moves fore and aft between closed and open positions of the openings. Additionally, the moon roof controller 24 is shown having a microprocessor 26 and memory 28. It should be appreciated that the microprocessor 26 may include analog and/or digital circuitry for processing the control routine 30 and thresholds 32 and controlling activation of the closure member 13. Stored within memory 28 is a control routine 30 for controlling closure of the closure member 13 based on a plurality of determined thresholds including at least first and second anti-pinch thresholds.

The closure system 20 is shown having various inputs shown feeding to the controller 24 via a communication bus 34. The controller 24 inputs include signals from the front occupant seat sensor 36 which may include signals from PODS sensors in the driver's seat and front passenger's seat. Inputs are also received from body control module 38, a glass tilt switch 40, a glass slide switch 42, the key fob 44 and the IR sensor 46. The body control module 38 may include various information provided on board the vehicle, such as the vehicle ignition state (on or off). The glass tilt switch 40 and glass slide switch 42 are user actuatable switches used to control movement of the closure member 13.

One of the window assemblies 14 is further illustrated connected to the communication bus 34 such that the one or more window assemblies 14 may receive some of or all of the same signals that are input to the moon roof assembly 12. The moon roof assembly 12 is controlled by the controller 24 and may be closed based on the automatic closing control routine 30, according to one embodiment. However, it should be appreciated that one or both window assemblies 14 may likewise be controlled by a controller to close the closure member based on the same or similar control routine 30 to control closure of the side door window closure members 15.

The key fob 44 is illustrated having a controller 48 and a transmit radio frequency (RF) 50. It should be appreciated that the transmit RF signal 50 may be processed to determine the relative distance of the key fob 44 from the vehicle 10. This may be achieved by processing the transmit RF signal for variations that are present based on transmit distance from the vehicle 10. For example, the transmit RF signal amplitude may be compared to a threshold amplitude to determine whether the key fob 44 is within a certain distance of the vehicle 10. By knowing the distance between the key fob 44 and vehicle 10, the location of the occupant driver in possession of the key fob 44 can be inferred or determined.

Figure 3:
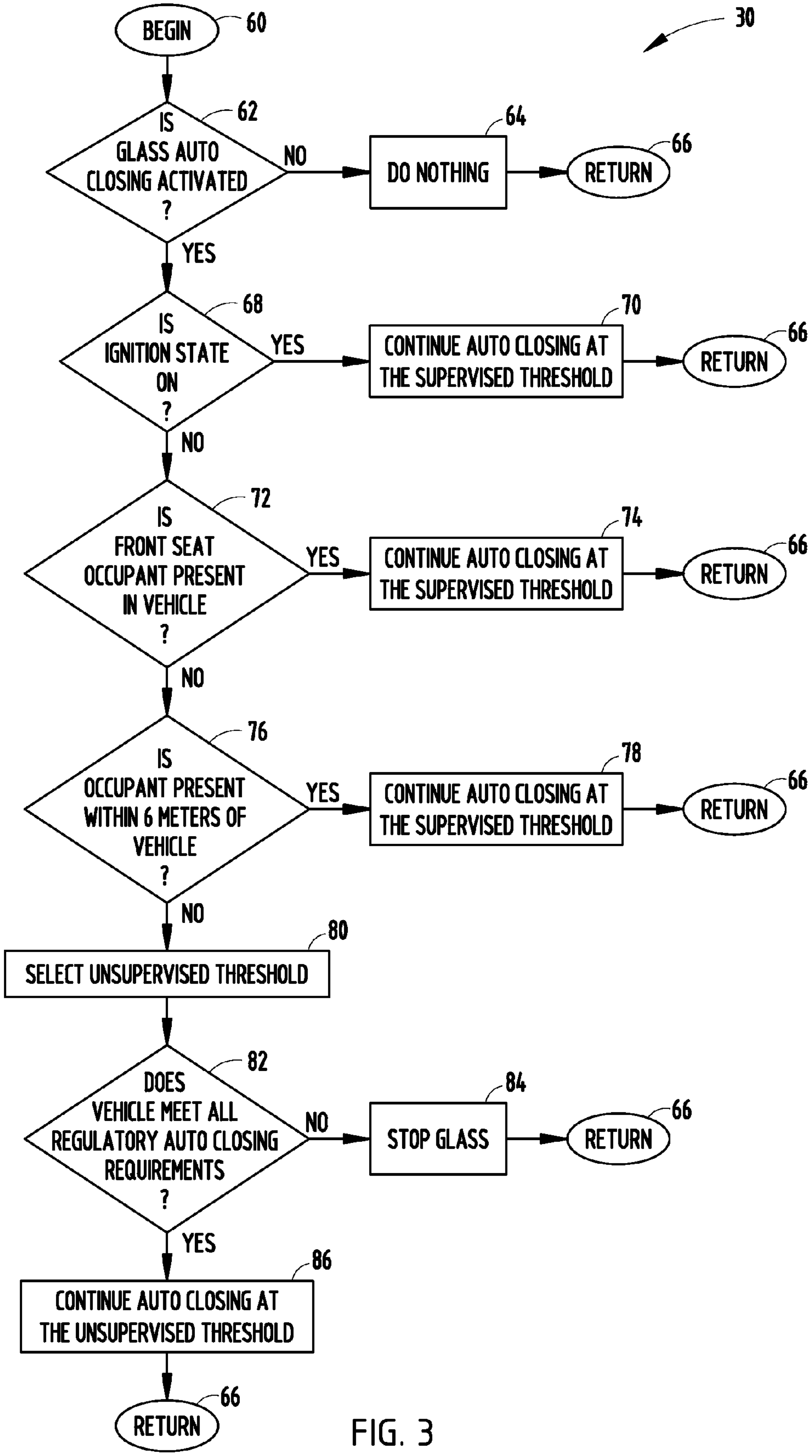
FIG. 3 is a flow diagram illustrating a control routine employed in the anti-pinch control system.

Referring to FIG. 3, the control routine 30 is illustrated according to one embodiment for implementing an auto close function to automatically close one or more closure members (e.g., glass member) relative to an opening in the body of the vehicle. The control routine 30 shown and described herein is applicable to a scenario where the closure member is in the process of closing when the vehicle ignition is turned off. However, control routine 30 may be applied to other scenarios such as where the closure process is started after the vehicle ignition is turned off. Routine 30 begins at step 60 and proceeds to determine whether the glass auto closing function is activated and, if not, does nothing at step 64 before returning at step 66. If the glass auto closing is activated, routine 60 proceeds to decision step 68 to determine whether the vehicle ignition state is on. If the vehicle ignition state is on, routine 60 proceeds to continue the auto closing procedure to close the closure member(s) at step 70 and returns at step 66. It should be appreciated that the auto closing function will close the closure member(s) using the default supervised first anti-pinch threshold for anti-pinch protection control. The auto closing function may automatically be activated upon turning the vehicle ignition off or may otherwise be activated such by a user switch in the vehicle or on the key fob.

If the ignition state is off, control routine 30 will proceed to decision step 72 to determine if a sensed front seat occupant is present in the vehicle, as determined by the PODS 18 or other occupant sensor. If an occupant presence is detected in a front seat of the vehicle, routine 60 will proceed to step 74 to continue the auto closing function using the default supervised threshold for the anti-pinch protection control, and returns at step 66. If no occupant has been sensed in a front seat of the vehicle, routine 30 proceeds to decision step 76 to determine if an occupant is present within a distance of six meters of the vehicle. This can be achieved by processing the output RF signal transmitted by the key fob 44 to determine whether the key fob is located within a certain distance, such as six meters, of the vehicle 10, according to one embodiment. It should be appreciated that the relative position of the key fob 44 or the user (e.g., driver) relative to the vehicle 10 may otherwise be determined. If the user is determined to be within six meters of the vehicle 10, the user is determined to be in close proximity to the vehicle and routine 30 proceeds to step 78 to continue auto closing using the supervised threshold, and then returns to step 66. If the occupant or user is not within six meters of the vehicle 10, routine 30 proceeds to step 80 to select the unsupervised second anti-pinch threshold to be used during the auto closing feature. The selected unsupervised anti-pinch threshold is a threshold that is lower than the default supervised anti-pinch threshold, according to one embodiment, such that a lower sensed force applied to the closure member may cause the motor to stop and reverse direction to minimize or prevent damage to an intrusive object that may be pinched between the closure member and the opening. Next, routine 30 will proceed to decision step 82 to determine whether the vehicle meets all regulatory auto closing requirements, and if so, will continue the auto closing function at the unsupervised anti-pinch threshold of step 86, before returning at step 66. If the vehicle does not meet all regulatory auto closing requirements, then control routine 30 will proceed to stop the glass movement at step 84 and returns at step 66.

It should be appreciated that the control routine 30 may reset the threshold to the supervised anti-pinch threshold, according to one embodiment, each time the control routine 30 is repeated. According to another embodiment, the selected anti-pinch threshold may remain as the unsupervised threshold, until an occupant is detected to be within a certain distance, such as six meters, of the vehicle 10.

Accordingly, the vehicle 10 and method of controlling the auto close feature of a closure member 13 or 15 advantageously provides for an enhanced closure technique which may minimize risk to objects that could otherwise be damaged by the closure member. While the closure technique and method has been described in connection with a moon roof or sunroof or side door windows, it should be appreciated that the control technique may be applicable to other closure features, such as the closure of a powered vehicle door.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A vehicle comprising:

a body having an opening;

a closure member;

an actuator for actuating the closure member between open and closed positions of the opening;

an occupant detector for detecting presence of an occupant; and a controller controlling the actuator to actuate the closure member based on a first anti-pinch threshold when an occupant is detected and based on a second anti-pinch threshold when no occupant is detected.

2. The vehicle as defined in claim 1, wherein the second anti-pinch threshold is less than the first anti-pinch threshold.

3. The vehicle as defined in claim 1, wherein the closure member is actuated to the closed position in response to automatic closing of the closure member with the vehicle ignition turned off.

4. The vehicle as defined in claim 1, wherein the closure member comprises one of a moon roof and sunroof.

5. The vehicle as defined in claim 1, wherein the closure member comprises a window.

6. The vehicle as defined in claim 1, wherein the actuator comprises a motor and the first and second anti-pinch thresholds are compared to sensed current in the motor, wherein when the sensed current exceeds a selected one of the first and second anti-pinch thresholds, the motor is stopped or reversed.

7. The vehicle as defined in claim 1, wherein the occupant detector comprises a passenger occupant detection sensor provided in a vehicle seat.

8. The vehicle as defined in claim 1, wherein the occupant detector comprises an infrared sensor.

9. The vehicle as defined in claim 1, wherein the occupant detector detects the presence of the occupant when the occupant is in close proximity to the vehicle.

10. The vehicle as defined in claim 9, wherein the occupant detector senses location of a vehicle key fob.

11. The method as defined in claim 10, wherein an RF signal of the key fob is processed to determine location of the key fob relative to the vehicle.

12. A system for controlling a closure member between open and closed positions of an opening in a body of a vehicle, said system comprising:

an occupant detector for detecting presence of an occupant in close proximity to the vehicle; and a controller controlling an actuator to close the closure member based on a first anti-pinch threshold when an occupant is detected and based on a second anti-pinch threshold when no occupant is detected.

13. The system as defined in claim 12, wherein the second anti-pinch threshold is less than the first anti-pinch threshold.

14. The system as defined in claim 12, wherein the first and second anti-pinch thresholds are compared to sensed current in a motor of the actuator, wherein when the sensed current exceeds a selected one of a first and second anti-pinch thresholds, the motor is stopped or reversed.

15. The system as defined in claim 12, wherein the occupant detector comprises a passenger occupant detection sensor provided in a vehicle seat.

16. The system as defined in claim 12, wherein the occupant detector comprises an infrared sensor.

17. The system as defined in claim 12, wherein the occupant detector senses location of a vehicle key fob, wherein an RF signal of the key fob is processed to determine location of the key fob relative to the vehicle.

18. A method of controlling a vehicle closure comprising the steps of:

detecting a vehicle occupant in close proximity to the vehicle;

selecting an anti-pinch threshold from a plurality of preset anti-pinch thresholds based on the occupant detection;

actuating a motor to close the closure member relative to an opening in the body of the vehicle;

sensing current of the motor;

comparing the motor current to the selected anti-pinch threshold to determine whether the closure member may be pinched by an object; and reversing or stopping the motor when the current exceeds the selected anti-pinch threshold.

19. The method as defined in claim 18, wherein the occupant of the vehicle is detected in close proximity to the vehicle based on a passenger occupant detection sensor in a vehicle seat.

20. The method as defined in claim 18, wherein the occupant of the vehicle is detected in close proximity to the vehicle based on location of a vehicle key fob.

21. The method as defined in claim 20, wherein the location of the key fob is detected based on a transmit RF signal.

22. The method as defined in claim 18, wherein the step of sensing whether a vehicle occupant is in close proximity to the vehicle comprises sensing whether an occupant is seated in a vehicle seat.

23. The method as defined in claim 22, wherein the step of selecting the anti-pinch threshold comprises selecting a first anti-pinch threshold when an occupant is detected in close proximity to the vehicle and selecting a second anti-pinch threshold when no occupant is detected in close proximity to the vehicle.

24. The method as defined in claim 23, wherein the second anti-pinch threshold is less than the first anti-pinch threshold.

25. The method as defined in claim 18, wherein the vehicle occupant is determined to be in close proximity to the vehicle based on sensing by an infrared sensor.

26. The method as defined in claim 18, wherein the closure member comprises a window.

27. The method as defined in claim 18, wherein the closure member comprises one of a moon roof and sunroof.

28. The method as defined in claim 18, wherein the closure member is actuated to the closed position in response to automatic closing of the closure member with the vehicle ignition turned off.

* * * * *